US011800254B2

(12) United States Patent
Morishita

(10) Patent No.: US 11,800,254 B2
(45) Date of Patent: Oct. 24, 2023

(54) IMAGE SENSOR

(71) Applicant: Renesas Electronics Corporation, Tokyo (JP)

(72) Inventor: Fukashi Morishita, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 17/850,264

(22) Filed: Jun. 27, 2022

(65) Prior Publication Data

US 2023/0022468 A1 Jan. 26, 2023

(30) Foreign Application Priority Data

Jul. 20, 2021 (JP) ................................. 2021-119572

(51) Int. Cl.
*H04N 25/75* (2023.01)
*H04N 25/60* (2023.01)

(52) U.S. Cl.
CPC ............. *H04N 25/75* (2023.01); *H04N 25/60* (2023.01)

(58) Field of Classification Search
CPC ......... H04N 25/75; H04N 25/60; H04N 25/78
See application file for complete search history.

(56) References Cited

U.S. PATENT DOCUMENTS

| 9,253,423 | B2 * | 2/2016 | Shida | ................... | H04N 25/745 |
| 11,223,791 | B2 * | 1/2022 | Asakura | ............... | H03M 1/1295 |
| 2015/0042856 | A1 * | 2/2015 | Nakamura | ............. | H04N 25/74 348/297 |

FOREIGN PATENT DOCUMENTS

JP 2014090325 A 5/2014

* cited by examiner

*Primary Examiner* — Nhan T Tran
(74) *Attorney, Agent, or Firm* — SCULLY, SCOTT, MURPHY & PRESSER, P.C.

(57) ABSTRACT

An image sensor including an ADC circuit receiving pixel data to be supplied in parallel from the a pixel array, outputting a reference signal in accordance with a digital code, comparing the reference signal and the pixel data, and outputting the digital code at which the reference signal and the pixel data have a predetermined relation, the ADC circuit including a ramp-signal generating circuit outputting a ramp signal having a gradient with respect to change of the digital code, the gradient being different between when the digital code is in a first range and when the digital code is in a second range different from the first range and an attenuator receiving the ramp signal to be supplied and outputting the reference signal having a gradient being the same between when the digital code is in the first range and when the digital code is in the second range.

9 Claims, 15 Drawing Sheets

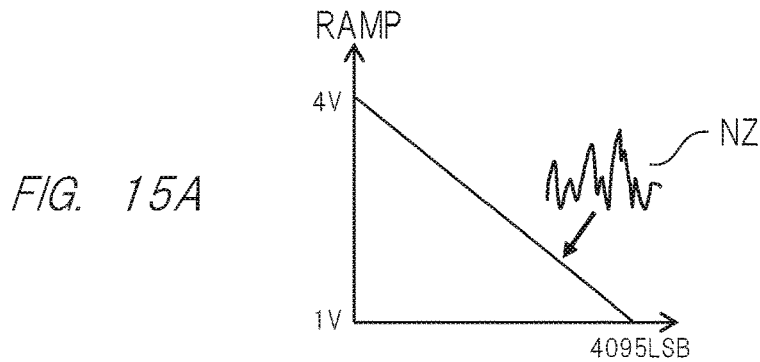
FIG. 15A
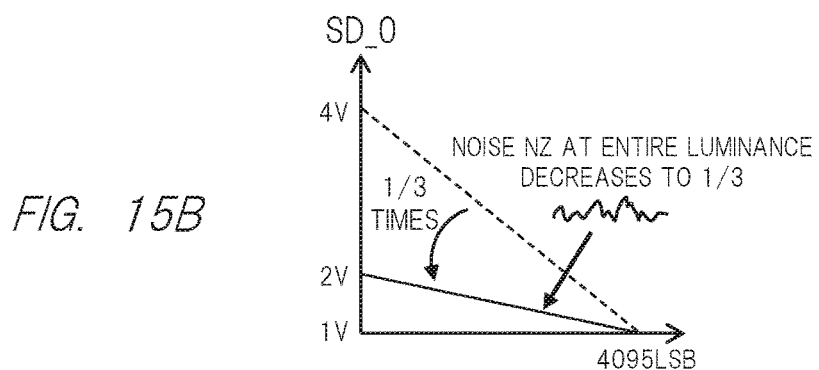
FIG. 15B
FIG. 16
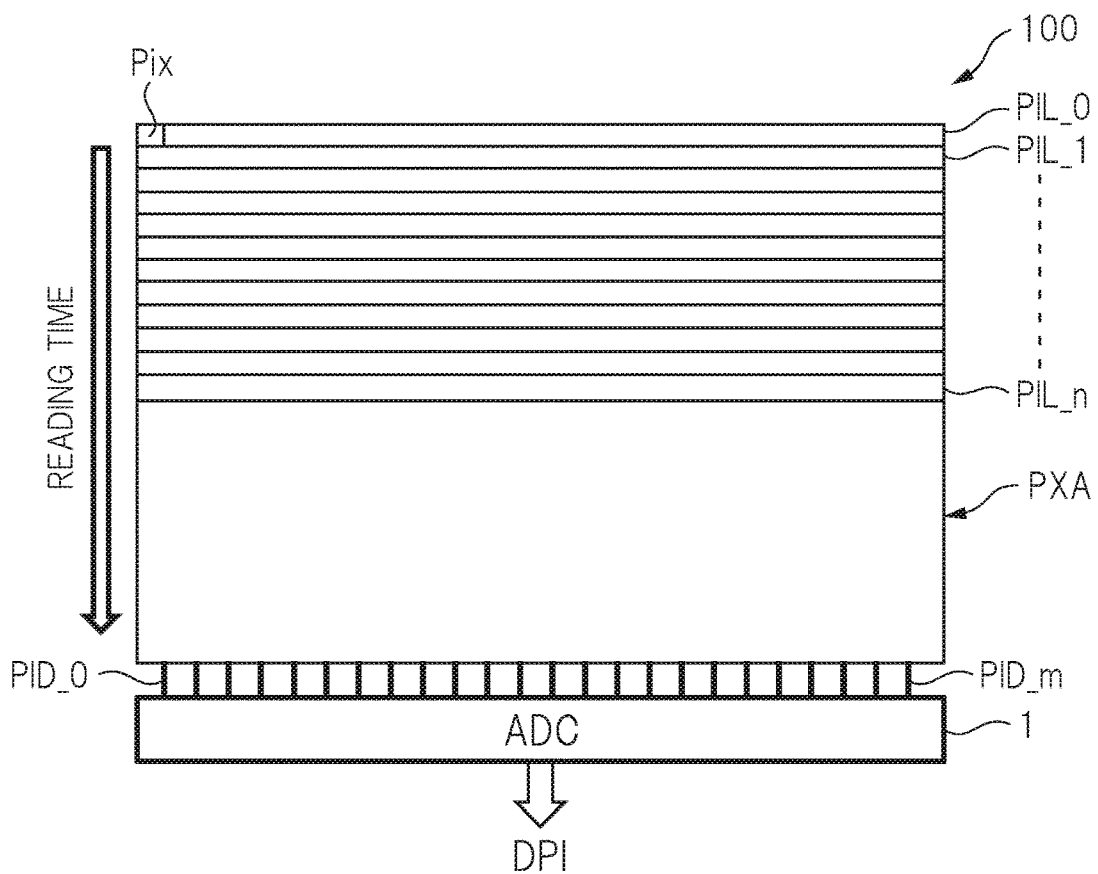

IMAGE SENSOR

CROSS-REFERENCE TO RELATED APPLICATION

The subject application claims priority under 35 USC § 119 to Japanese Patent Application No. 2021-119572 filed on Jul. 20, 2021. The disclosure of Japanese Patent Application No. 2021-119572, including the specification, drawings and abstract, is incorporated herein by reference in its entirety.

BACKGROUND

The present invention relates to an image sensor, and relates to, for example, an image sensor including an analog/digital (also referred to as ADC below) circuit and a pixel array having a plurality of image-capturing elements that are arranged in an array form, the image sensor converting pixel data output from the pixel array into a digital signal and outputting the digital signal.

There is a disclosed technique listed below.
[Patent Document] Japanese Unexamined Patent Application Publication No. 2014-90325

An image sensor (solid-state image-capturing element) including an imaging sensor corresponding to the pixel array, the ADC circuit and a ramp-wave generator is described in, for example, the Patent Document 1.

SUMMARY

The ADC circuit that converts the pixel data output from the pixel array into the digital signal is, for example, an ADC circuit that compares the pixel data and a ramp signal changing in accordance with a digital code, and outputs a value of the digital code at which, for example, the ramp signal and the pixel data match with each other, as the digital signal corresponding to the pixel data. According to the present inventors' studies, it has been found that, when noises of, for example, several tens of μV such as thermal noises and flicker noises superimpose the ramp signal, the digital signal converted by the ADC circuit is often recognized as a horizontal line when being displayed on a screen.

Human eyes are more sensitive to dim light than bright light. Therefore, particularly when the noises superimpose the ramp signal at the time of the conversion of the pixel data resulted from the image capturing of the dim light into the digital signal, the horizontal lines on the screen are easy to be noticed, and improvement of an ISO sensitivity is limited.

The Patent Document 1 does not describe that the horizontal lines are easy to be noticed because of the noises superimposing the ramp signal.

The summary of the typical aspects of the inventions disclosed in the present application will be briefly described as follows:

An image sensor includes a pixel array having a plurality of image-capturing elements and an ADC circuit receiving pixel data to be supplied in parallel from the pixel array. The ADC circuit includes: a reference-signal generating circuit outputting a reference signal in accordance with a digital code; and a comparing circuit comparing the reference signal and the pixel data, and outputs the digital code at which the reference signal and the pixel data have a predetermined relation. In this case, the reference-signal generating circuit includes: a ramp-signal generating circuit outputting a ramp signal having a gradient with respect to change of the digital code, the gradient being different between when the digital code is in a first range and when the digital code is in a second range different from the first range; and an attenuator receiving the ramp signal to be supplied and outputting the reference signal having a gradient that is the same between when the digital code is in the first range and when the digital code is in the second range.

Other objects and novel characteristics will be apparent from the description of the present specification and the accompanying drawings.

According to one embodiment, an image sensor in which ISO sensitivity can be improved by noise reduction can be provided.

BRIEF DESCRIPTIONS OF THE DRAWINGS

FIG. 15A is a waveform diagram for explaining an operation of the image sensor according to the fourth embodiment.

FIG. 15B is a waveform diagram for explaining an operation of the image sensor according to the fourth embodiment.

FIG. 16 is a schematic plan view of the image sensor according to the first embodiment.

DETAILED DESCRIPTION

Figure 1:
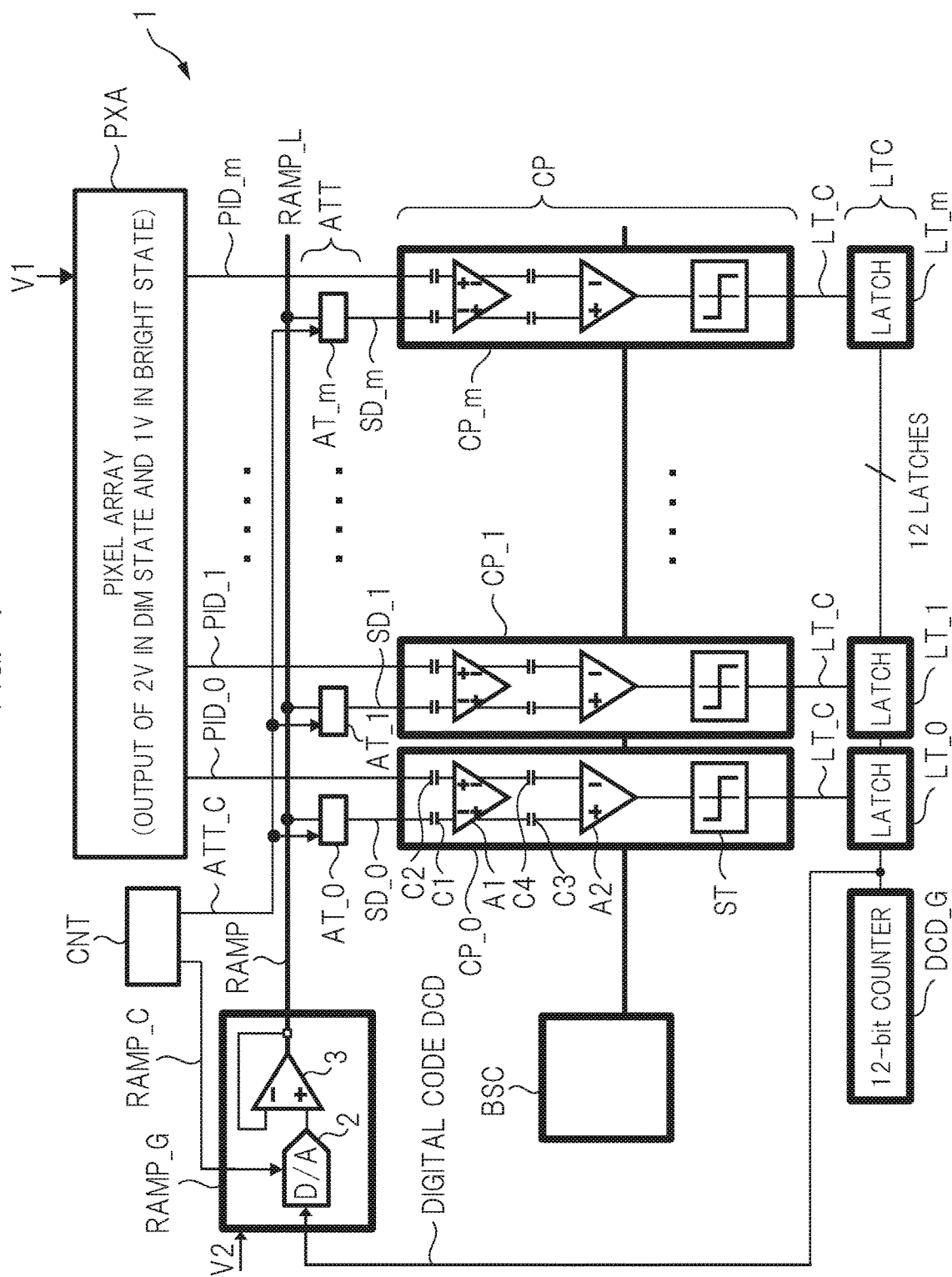
FIG. 1 is a block diagram showing a configuration of an image sensor according to a first embodiment.

The following is explanation about each embodiment of the present invention with reference to drawings. Note that only one example is disclosed, and appropriate modification with keeping the concept of the present invention which can be easily anticipated by those who are skilled in the art is obviously within in the scope of the present invention.

In the present specification and each drawing, similar elements to those described earlier for the already-described drawings are denoted with the same reference signs, and detailed description thereof is appropriately omitted in some cases.

In the following explanation, an example of an image sensor including a pixel array and an ADC circuit arranged on one semiconductor chip will be explained. However, the present invention is not limited to this. For example, the pixel array and the ADC circuit may be arranged on different semiconductor chips.

First Embodiment

<Entire Configuration>

FIG. 16 is a schematic plan view of the image sensor according to the first embodiment. Although an image sensor 100 is made of a plurality of circuit blocks arranged on one semiconductor chip, only certain circuit blocks for the explanation are illustrated in the drawing. In FIG. 16, a term "Pix" represents an image-capturing element capturing images. A plurality of image-capturing elements Pix are arranged in an array form to configure a pixel array PXA.

Although not particularly limited, a plurality of image-capturing elements arranged on the same column (pixel column) in the pixel array PXA are connected to a pixel data line while a plurality of image-capturing elements arranged on the same row (pixel row) therein are simultaneously selected at the time of reading. In FIG. 16, the pixel rows are exemplified as PIL_0 to PIL_n, and the pixel data lines are exemplified as PID_0 to PID_m.

The pixel data lines PID_0 to PID_m of the pixel array PXA are connected to an ADC circuit 1. At the time of reading on the pixel array PXA, as shown in, for example, FIG. 16, the pixel data is sequentially readout from the plurality of image-capturing elements Pix arranged on the same pixel row to the pixel data lines PID_0 to PID_m in a direction from the pixel data line PIL_0 to the pixel data line PIL_n. The read-out pixel data is converted into the corresponding digital signal by the ADC circuit 1, and is output as digital pixel data DPI from the ADC circuit 1.

<Configuration of ADC Circuit>

FIG. 1 is a block diagram showing a configuration of an image sensor according to a first embodiment. In FIG. 1, the pixel array PXA operates at a first voltage V1 serving as its operational voltage, and the ADC circuit 1 operates at a second voltage V2 serving as its operational voltage that is lower in an absolute value than the first voltage V1. The first voltage V1 is, for example, 5 (V), and the second voltage V2 is, for example, 3.3 (V).

The image-capturing element Pix (FIG. 16) is designed to output the pixel data of, for example, 2 (V) when an image of the dimmest light is captured, and output the pixel data of, for example, 1 (V) when an image of the brightest light is captured. In other words, depending on luminance of the captured image light, the value of the pixel data varies between 1 (V) and 2 (V).

By the reading out, the pixel data of 1 (V) to 2 (V) is supplied in parallel to the ADC circuit 1 from the pixel array PXA through the pixel data lines PID_0 to PID_m.

The ADC circuit 1 includes a ramp-signal generating circuit (generator circuit) RAMP_G that generates the ramp signal RAMP, an attenuator ATT, a control circuit CNT, a comparing circuit CP, a bias circuit BSC, a latch circuit LTC, and a code generating circuit DCD_G generating a digital code DCD.

The ramp-signal generating circuit RAMP_G includes a digital/analog converting (also referred to as DAC below) circuit 2, and a voltage follower circuit 3. The DAC circuit 2 receives the digital code DCD supplied thereto, and converts a value (digital code value) of the digital code DCD into an analog signal. The converted analog signal is suppled to the voltage follower circuit 3 made of a calculator. An output of the voltage follower circuit 3 is suppled as the ramp signal RAMP to a ramp signal line RAMP_L.

The ramp-signal generating circuit RAMP_G operates at the second voltage V2 serving as its operation voltage. The digital code DCD is generated by the code generating circuit DCD_G. In the first embodiment, the code generating circuit DCD_G is made of a 12-bit counter, and the digital code DCD is made of a binary signal of 12 bits. Since the 12-bit counter performs count up or down in accordance with time passage, the value of the digital code DCD changes in accordance with time. When the value of the digital code DCD is expressed in decimal, the value of the digital code DCD changes, for example, from 0 to 4095 in accordance with time passage.

Since the value of the digital code DCD changes (increases or decreases) in accordance with time passage, a voltage of the analog signal output from the DAC circuit 2 also changes, and a voltage of the ramp signal RAMP also changes in accordance with time passage. In the first embodiment, the DAC circuit 2 is controlled by a ramp control signal RAMP_C output from the control circuit CNT. Although explained with reference to the drawings later, a reference electric current of the DAC circuit 2 is switched by the ramp control signal RAMP_C. By the switching of the reference electric current, the gradient of the ramp signal RAMP with respect to the digital code DCD is changed.

The ramp signal RAMP is supplied as a reference signal SD (SD_0 to SD_m) to the comparing circuit CP through the attenuator ATT. A gain of the attenuator ATT is switched by an attenuator control signal ATT_C output from the control circuit CNT. In other words, the attenuator ATT is an attenuator that attenuates the ramp signal RAMP in accordance with the gain indicated by the attenuator control signal ATT_C. In the control circuit CNT, when the gradient of the ramp signal RAMP is switched by the ramp control signal RAMP_C, the gain of the attenuator ATT is also switched by the attenuator control signal ATT_C.

In the first embodiment, the attenuator ATT is made of a plurality of unit attenuators AT_0 to AT_m corresponding to the pixel data lines PID_0 to PID_m. The comparing circuit CP is also made of a plurality of comparators CP_0 to CP_m corresponding to the pixel data lines PID_0 to PID_m. In the explanation for the exemplified pixel data line PID_0, the ramp signal RAMP is supplied as the reference signal SD_0 from the corresponding unit attenuator AT_0 to the corresponding comparator CP_0. The comparator CP_0 compares the supplied reference signal SD_0 and the pixel data supplied through the corresponding pixel data line PID_0. Other unit attenuators AT_1 to AT_m and comparators CP_1 to CP_m are the same as the unit attenuator AT_0 and comparator CP_0.

To the comparators CP_0 to CP_m, a predetermined bias voltage is supplied from the bias circuit BSC. In the explanation for a comparator configuration of the exemplified comparator CP_0, the comparator includes capacitance elements C1 to C4, a differential amplifier A1, a comparator A2, and a schmitt trigger circuit ST. The reference signal SD_0 and the pixel data are supplied to the differential amplifier A1 through the capacitance elements C1 and C2, and are amplified. An output of the differential amplifier A1 is supplied to the comparator A2 through the capacitance elements C3 and C4 to compare a voltage of the reference signal SD_0 and a voltage of the pixel data. An output of the comparator A2 is supplied to the schmitt trigger circuit ST. If the voltage of the reference signal SD_0 and the voltage of the pixel data have the predetermined relation, in other words, match with each other, a latch trigger (trigger) signal LT_C is output from the schmitt trigger circuit ST to the latch circuit LTC.

The latch circuit LTC is also made of a plurality of unit latch circuits LT_0 to LT_m corresponding to the pixel data lines PID_0 to PID_m. Each of the unit latch circuits LT_0 to LT_m receives the digital code DCD supplied through 12 signal lines from the 12-bit counter configuring the code generating circuit DCD_G, and latches (retains) the value of the digital code DCD in response to the trigger signal LT_C output from the corresponding comparator. In the explanation for the exemplified unit latch circuit LT_0, this unit latch circuit latches the value of the supplied digital code DCD when receiving the trigger signal LT_C serving as a trigger supplied from the corresponding comparator CP_0. Other unit latch circuits LT_1 to LT_m are the same as the unit latch circuit LT_0.

In the above-described configuration, the reference signals SD_0 to SD_m and the pixel data of the pixel data lines PID_0 to PID_m are compared with each other. When these values in the comparison match with each other, the value of the digital code DCD supplied at this time is latched by the unit latch circuits LT_0 to LT_m. The value of the digital code DCD latched by the latch circuit LTC is output as the digital pixel data DPI (FIG. 16) corresponding to the pixel data.

In FIG. 1, the reference signals SD_0 to SD_m based on the digital code signal DCD are generated by the ramp-signal generating circuit RAMP_G, the attenuator ATT and the control circuit CNT. Therefore, the reference-signal generating circuit that generates the reference signal can be regarded to be made of the ramp-signal generating circuit RAMP_G, the attenuator ATT and the control circuit CNT. And, the comparators CP_0 to CP_m can be regarded as a 1-bit ADC circuit. Note that the configurations of the comparators CP_0 to CP_m shown in FIG. 1 are one example, and the present invention is not limited to these configurations.

<Operation of Reference-Signal Generating Circuit>

Next, an operation of the reference-signal generating circuit will be explained with reference to the drawings. Each of FIGS. 2 to 4 is a diagram for explaining the operation of the image sensor according to the first embodiment.

Figure 2:
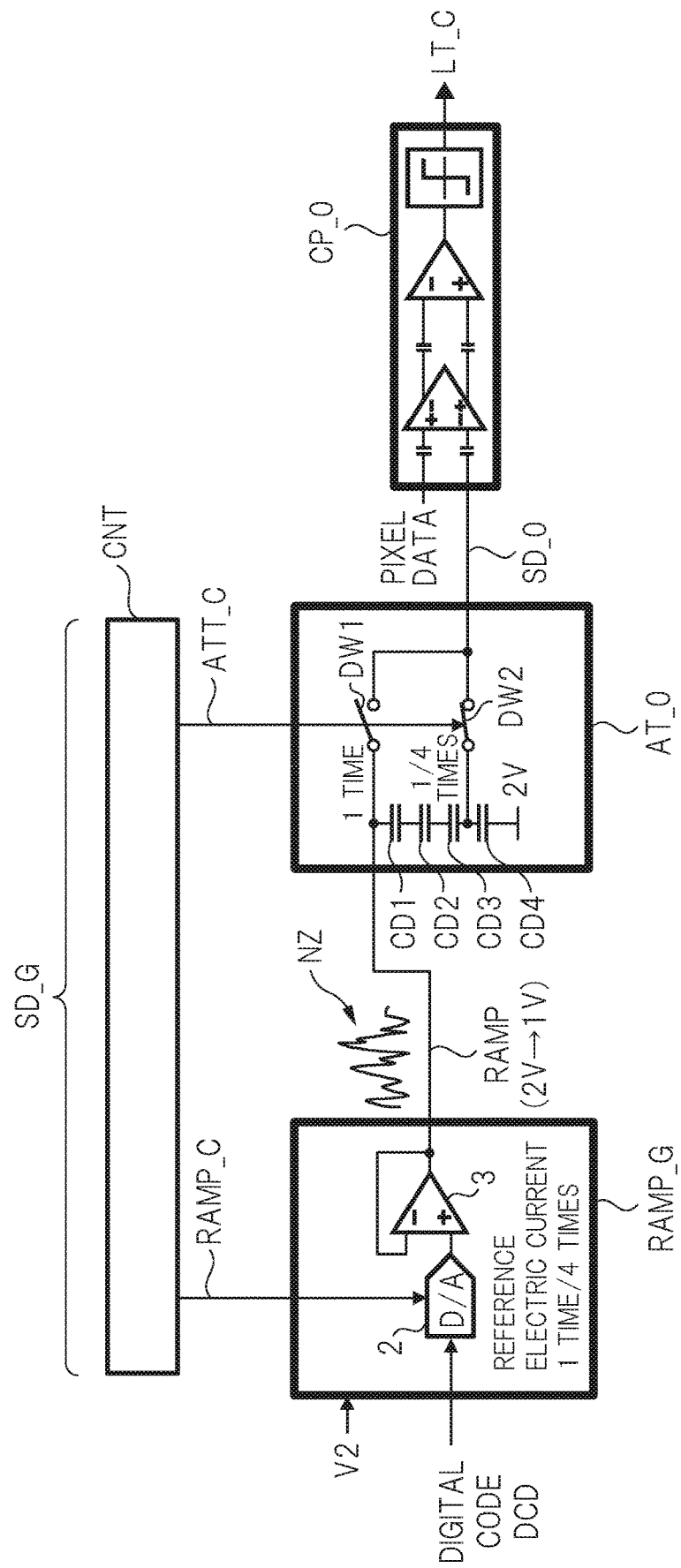
FIG. 2 is a diagram for explaining an operation of the image sensor according to the first embodiment.
Figure 3:
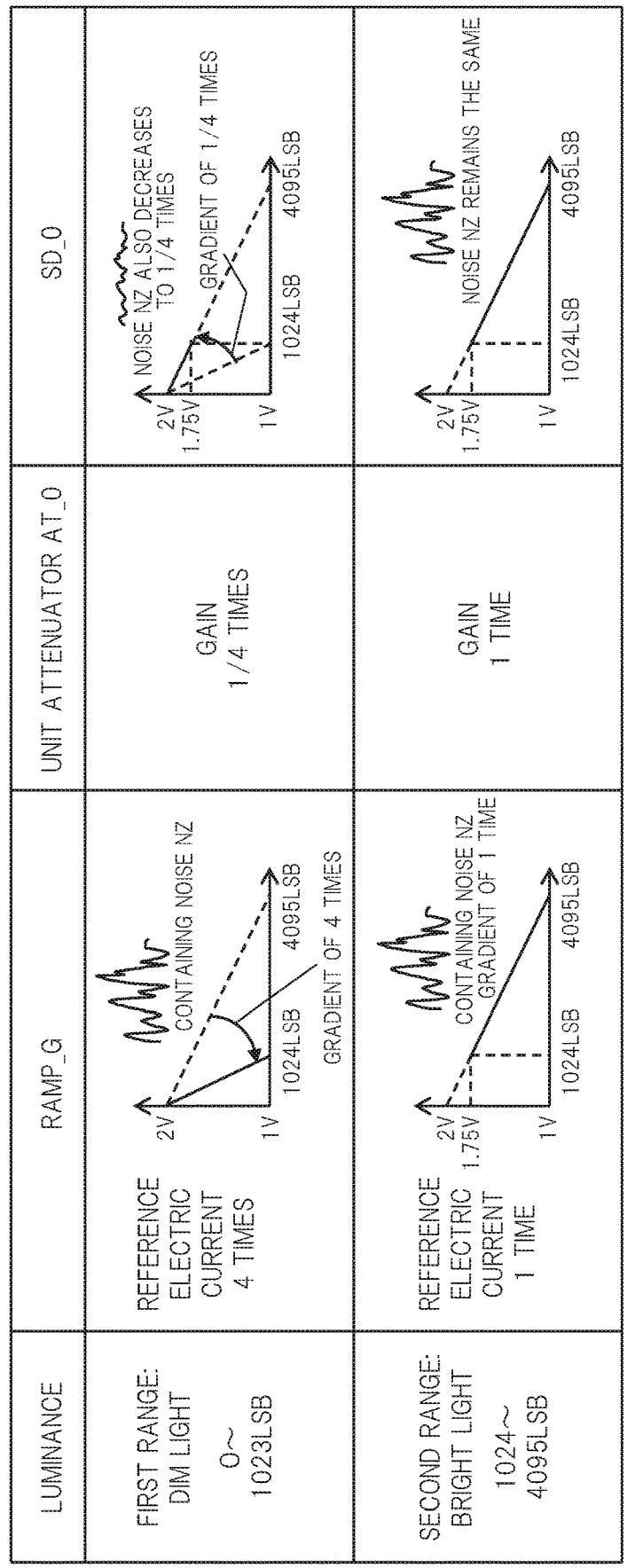
FIG. 3 is a diagram for explaining the operation of the image sensor according to the first embodiment.

FIG. 2 shows the ramp-signal generating circuit RAMP_G, the control circuit CNT, and the unit attenuator AT_0 and the comparator CP_0 corresponding to the pixel data line PID_0 in the configuration shown in FIG. 1. The operation will be explained in the exemplified unit attenuator AT_0 and comparator CP_0 corresponding to the pixel data line PID_0. However, the operation is the same even in the unit attenuators and the comparators corresponding to other pixel data lines. In FIG. 2, note that the term "SD_G" represents the reference-signal generating circuit provided when the reference-signal generating circuit is regarded to be made of the ramp-signal generating circuit RAMP_G, the control circuit CNT, and the attenuator ATT.

In FIG. 2, the unit attenuator AT_0 is made of four capacitance elements CD1 to CD4 that are connected in series between the ramp signal line RAMP_L (FIG. 1) and a predetermined voltage. Values of the four capacitance elements CD1 to CD4 are designed to be the same as one another. The voltage of the ramp signal RAMP is divided by the four capacitance elements, and a gain is determined depending on from which one of the capacitance elements the reference signal SD_0 is extracted. In this case, as the predetermined voltage, the voltage of the pixel data output from the pixel array PXA is equivalent to the voltage value (2 (V)) provided at the dimmest light. The unit attenuator AT_0 is made of the capacitance element, and can be regarded as a voltage dividing circuit that divides the differential voltage between the ramp signal RAMP and the predetermined voltage.

The gain of the unit attenuator AT_0 shown in FIG. 2 can be set to 1 time (once, original) or ¼ times by the attenuator control signal ATT_C. In other words, by the attenuator control signal ATT_C, the gain can be set to 1 time since the switch DW1 is turned ON, and set to ¼ times since the switch DW2 is turned ON. The voltage difference between the voltage of the ramp signal RAMP on the ramp signal line RAMP_L and the predetermined voltage (2 (V)) is multiplied by the set gain, the divided voltage that is calculated by the multiplication is subtracted from the predetermined voltage, and the voltage value that is the subtraction result is output from the attenuator AT_0. For example, as shown in FIG. 2, when the gain is set to ¼ times, the differential voltage between the ramp signal RAMP and the predetermined voltage is multiplied by ¼, the voltage that is the multiplication result is subtracted from 2 (V), the voltage value that is the subtraction result is output from the attenuator AT_0.

In FIG. 2, a term "NZ" represents the noises superimposed on the ramp signal RAMP output from the ramp-signal generating circuit RAMP_G. The noise NZ is generated by, for example, the thermal noises, the flicker noises or others as described above, and varies up and down with respect to, for example, a ground voltage in accordance with time passage as shown in FIG. 2.

In FIG. 2, the reference electric current of the DAC circuit 2 is designed to be switched to 1 time or ¼ times by the ramp control signal RAMP_C. Note that examples of the DAC circuit 2 and the switching of its reference electric current will be explained later with reference to FIGS. 5A to 5C. The gain of the unit attenuator AT_0 is designed to be switched to 1 time or ¼ times by the attenuator control signal ATT_C.

The voltage of the ramp signal RAMP varies between 2 (V) equivalent to the voltage of the pixel data of the dim light and 1 (V) equivalent to the voltage of the pixel data of the bright light. By the ADC circuit 1, the pixel data of the dim light is designed to be converted to the value of the digital code DCD in a range of 0 to 1023 (in decimal) (first range) while the pixel data of the bright light is designed to be converted to the value of the digital code DCD in a range of 1024 to 4095 (in decimal) (second range).

In the first embodiment, as shown in FIG. 3, when the value of the digital code DCD is in the first range, the control circuit CNT sets the reference electric current in the ramp-signal generating circuit RAMP_G to 4 times by using the ramp control signal RAMP_C, and sets the gain of the unit attenuator AT_0 to ¼ times by using the attenuator control signal ATT_C. On the other hand, when the value of the digital code DCD is in the second range, the control circuit CNT sets the reference electric current in the ramp-signal generating circuit RAMP_G to 1 time by using the ramp control signal RAMP_C, and sets the gain of the unit attenuator AT_0 to 1 time by using the attenuator control signal ATT_C.

When the value of the digital code DCD is in the first range, the reference electric current in the ramp-signal generating circuit RAMP_G is set to 4 times, and therefore, the voltage change of the ramp signal RAMP varying depending on the least significant bit of the digital code DCD is 4 times. Therefore, as shown in FIG. 3, when the value of the digital code DCD changes from 0 to 1023, the voltage of the ramp signal RAMP changes from 2 (V) to 1 (V), and the gradient of the voltage change of the ramp signal RAMP with respect to the value change of the digital code DCD is 4 times as compared when the reference electric current is 1 time.

On the other hand, when the value of the digital code DCD is in the second range, that is the range from 1024 to 4095, the reference electric current is set to 1 time, and therefore, the gradient of the voltage change of the ramp signal RAMP is 1 time that is smaller than that in the case of the reference electric current of 4 times. In the first range, the voltage of the ramp signal RAMP changes from 2 (V) to 1 (V). After the switching to the second range, the voltage of the ramp signal RAMP changes to 1.75 (V) defined by "1024" that is the value of the digital code DCD, and then, the voltage of the ramp signal RAMP changes toward 1 (V).

The gain of the unit attenuator AT_0 is ¼ times when the value of the digital code DCD is in the first range. Therefore, in the first range, the voltage of the ramp signal RAMP is attenuated to change from 2 (V) to 1.75 (V) as shown to be a solid-line reference signal SD_0 in FIG. 3. In other words, by the unit attenuator AT_0, the ramp signal RAMP having the gradient of 4 times is converted to ¼ times, and then, is output as the reference signal SD_0. In this case, the noise NZ superimposed on the ramp signal RAMP is also attenuated to ¼ times, and therefore, the noise NZ can be controlled to have a small value.

On the other hand, when the value of the digital code DCD is in the second range, the gain of the unit attenuator AT_0 is 1 time. Therefore, the ramp signal RAMP is output as the reference signal SD_0 from the unit attenuator AT_0.

Figure 4A:
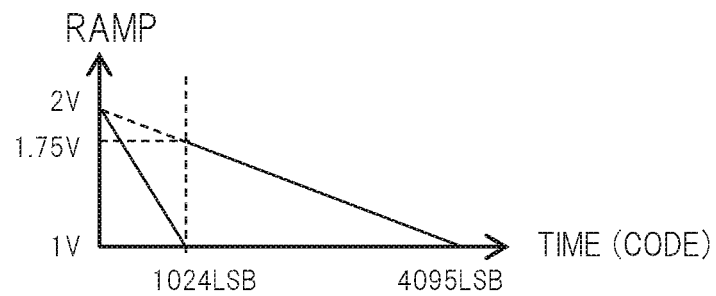
FIG. 4A is a waveform diagram for explaining the operation of the image sensor according to the first embodiment.
Figure 4B:
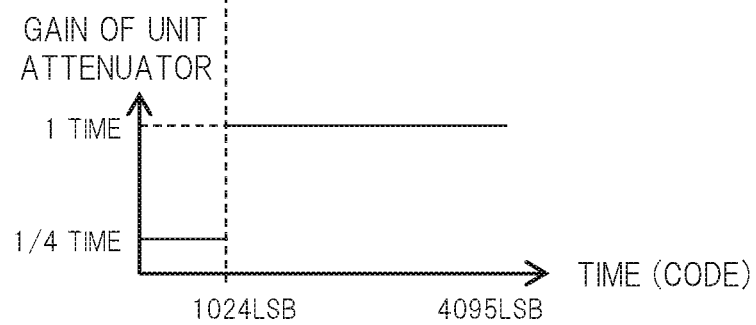
FIG. 4B is a waveform diagram for explaining the operation of the image sensor according to the first embodiment.
Figure 4C:
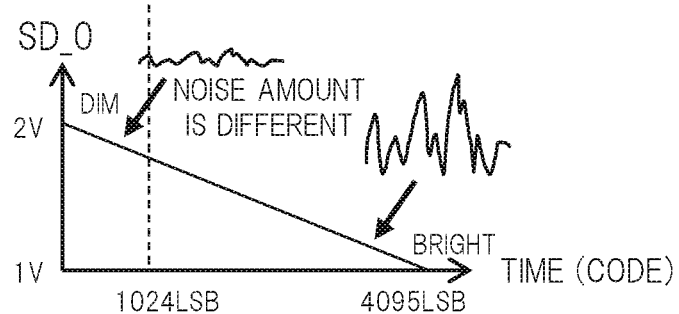
FIG. 4C is a waveform diagram for explaining the operation of the image sensor according to the first embodiment.

Each of FIGS. 4A to 4C shows the voltage change of the ramp signal RAMP, the gain change of the unit attenuator AT_0, and the voltage change of the reference signal SD_0 in accordance with the change of the digital code DCD. As shown in FIG. 4A, the gradient of the voltage change of the ramp signal RAMP with respect to the change of the digital code DCD is different between the first range and the second range. On the other hand, as shown in FIG. 4C, the voltage change of the reference signal SD_0 with respect to the change of the digital code DCD is the same between the first range and the second range.

The first embodiment can reduce the noise amount superimposed on the reference signal SD_0 since the noise superimposed on the ramp signal RAMP corresponding to the pixel data of the dim light, that is the ramp signal RAMP in the case of the value of the digital code DCD in the first range, is attenuated because the gain of the unit attenuator AT_0 is ¼ times. Since the noise amount is suppressed, it is impossible to reduce the recognition of the horizontal line viewed by human, and the ISO sensitivity can be improved.

The 12-bit counter that is the code generating circuit DCD_G according to the first embodiment counts up the value of the digital code DCD from 0 to 4059 in accordance with the time passage. Therefore, FIGS. 4A to 4C can be regarded to show the voltage change of the ramp signal RAMP, the gain change of the unit attenuator AT_0, and the voltage change of the reference signal SD_0 in accordance with the time passage.

Configurational Example of Ramp-Signal Generating Circuit

Figure 5A:
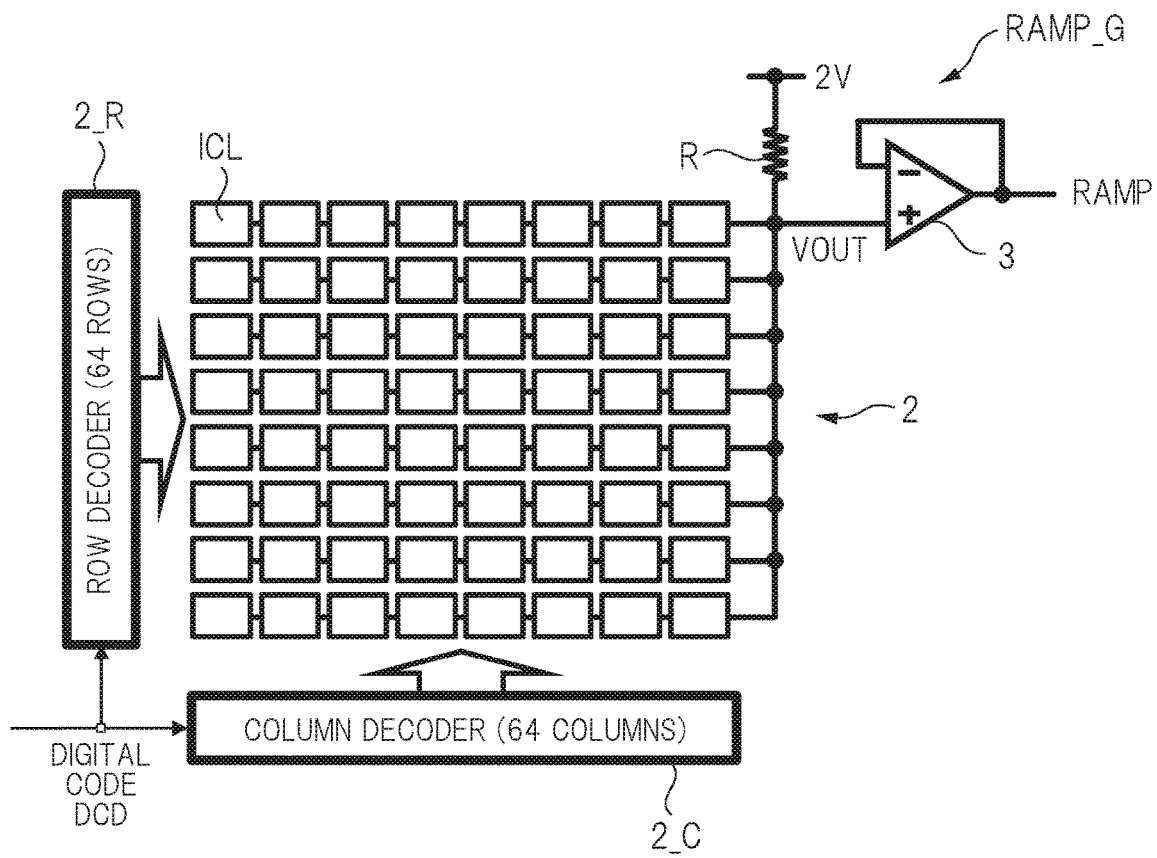
FIG. 5A is a diagram for explaining a ramp-signal generating circuit according to the first embodiment.
Figure 5B:
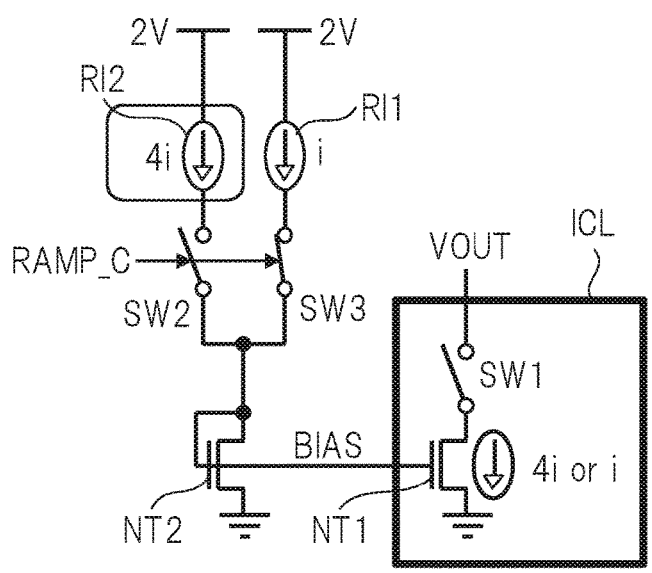
FIG. 5B is a diagram for explaining a ramp-signal generating circuit according to the first embodiment.
Figure 5C:
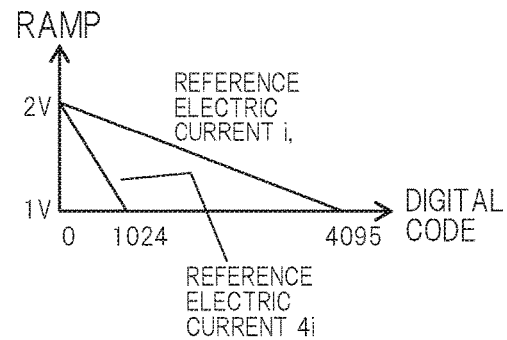
FIG. 5C is a diagram for explaining a ramp-signal generating circuit according to the first embodiment.

FIGS. 5A to 5C are diagrams for explaining the ramp-signal generating circuit according to the first embodiment. FIG. 5A is a diagram showing a configuration of the ramp-signal generating circuit RAMP_G, and FIG. 5B is a diagram showing configurations of an electric current cell and a reference electric current circuit used in the DAC circuit 2. FIG. 5C is a waveform diagram showing the voltage change of the ramp signal RAMP due to the switching of the reference electric current.

In FIG. 5A, the DAC circuit 2 includes: an electric current cell array having a plurality of electric current cells ICL arranged in a matrix form; a row decoder 2_R that selects a row from the electric current cell array; a column decoder 2_C that selects a column from the electric-current cell array; and a load resistor element R connected between the electric current cell selected from the electric current cell array and the voltage of 2 (V).

The digital code DCD is supplied to the row decoder 2_R and the column decoder 2_C. The row decoder 2_R decodes the digital code DCD, and selects 0 row, 1 row or a plurality of rows. Similarly, the column decoder 2_C decodes the digital code DCD, and selects 0 column, 1 column or a plurality of columns. The electric current cell ICL selected by both the row decoder 2_R and the column decoder 2_C is connected to the voltage 2 (V) through the load resistor element R, and the voltage of the ramp signal RAMP is output in accordance with the digital code DCD from a connection node VOUT arranged between the load resistor element R and the electric current cell array.

In FIG. 5A, note that an electric current cell array including the electric current cells ICL arranged in 8 rows×8 columns is exemplified in order to avoid the drawing from being complicated. When the digital code DCD changes in the range of 0 to 4095, the electric current cell array includes the electric current cells ICL arranged in 64 rows×64 columns. In accordance with the value of the digital code DCD, the number of the electric current cells selected from the electric current cell array increases, and the voltage of the connection node VOUT decreases.

As shown in FIG. 5B, the electric current cell ICL is made of an N-channel type field effect transistor NT1 and a switch SW1. Since the electric current cell ICL is selected by both row decoder 2_R and the column decoder 2_C, the switch SW1 of this electric current cell ICL is turned ON.

A gate of the N-channel type field effect transistor NT1 is connected to a bias circuit that is shared among all the electric current cells ICL, although not particularly limited. As shown in FIG. 5B, this bias circuit includes: an N-channel type field effect transistor NT2 connected to form diode connection; switches SW2 and SW3 selectively turned ON by the ramp control signal RAMP_C; and two constant electric current supplies RI1 and RI2.

The constant electric current supply RI1 outputs a reference electric current "i" of 1 time, and the constant electric current supply RI12 outputs a reference electric current "$4i$" of 4 times. A gate of the N-channel type field effect transistor NT1 and a gate of the N-channel type field effect transistor NT2 are connected in common to form a current mirror circuit. When the switch SW2 or SW3 is turned ON by the ramp control signal RAMP_C, the reference electric current $4i$ of 4 times or the reference electric current i of 1 time is supplied to the current mirror circuit, and the reference electric current $4i$ of 4 times or the reference electric current i of 1 time flows in the transistor NT1 inside the electric-current cell ICL.

In this manner, as shown in FIG. 5C, in the case of the reference electric current $4i$ of 4 times, the voltage of the ramp signal RAMP reaches 1 (V) while the value of the digital code DCD is 1023. In the case of the reference electric current i of 1 time, the voltage of the ramp signal RAMP reaches 1 (V) while the value of the digital code DCD is 4095. Note that the resistance value of the load resistor element R and the electric current value of the reference electric current i are set so that the connection node VOUT has 1 (V) when the transistors NT1 of all the electric current cells ICL are turned ON.

In the embodiment, the electric-current-cell matrix type DAC circuit having the electric current cells arranged in the matrix form has been explained as the DAC circuit 2 capable of switching the reference electric current. However, the configuration of the DAC circuit is not limited to the electric-current-cell matrix type DAC circuit.

Modification Example

FIG. 2 shows the example in which the gain of the attenuator ATT is switched to ¼ times and 1 time. The present invention is not limited to this example. The number of the switched gains may increase. As a modification example, an example in which the gain is switched to ¼ times, ½ times, ¾ times and 1 time will be explained.

Figure 6:
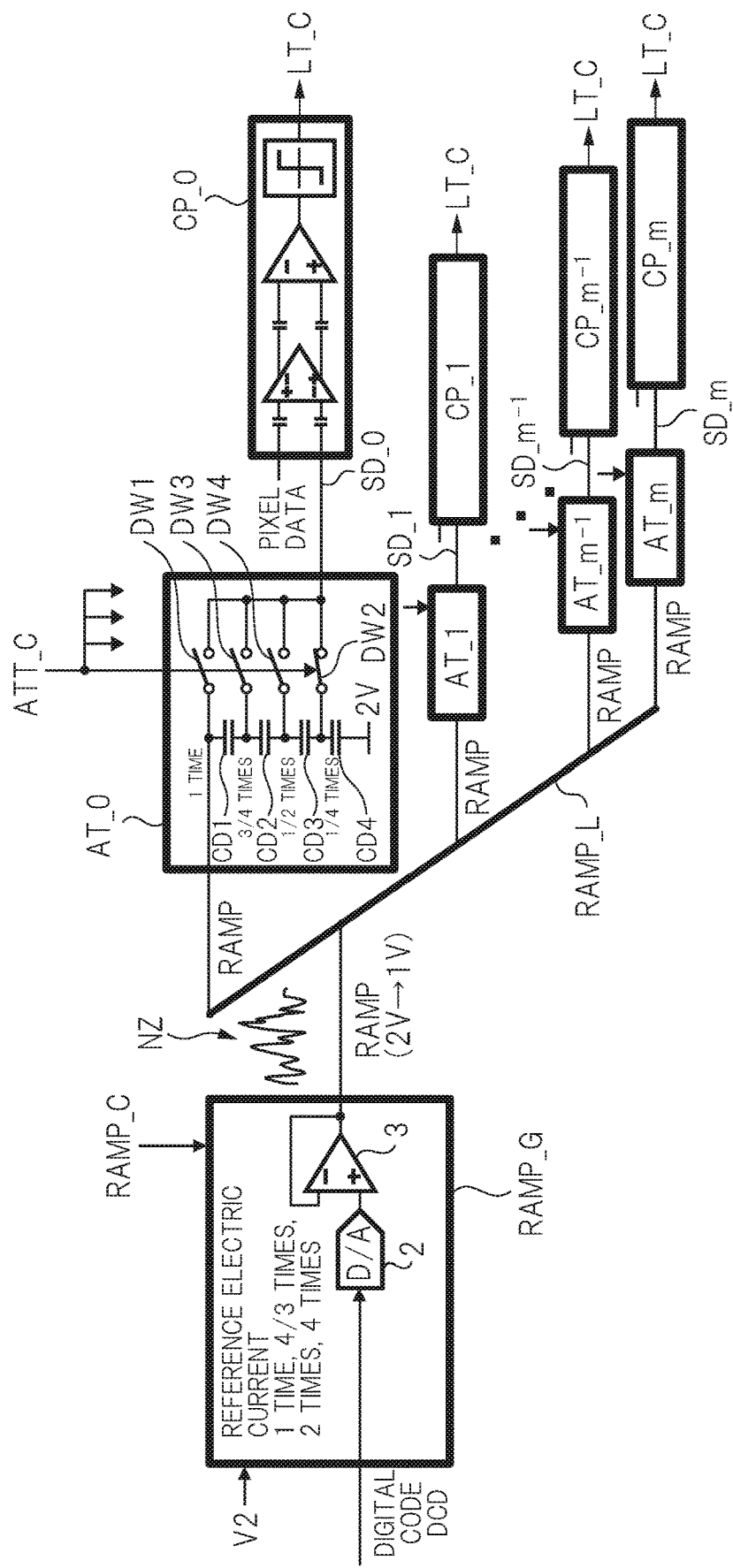
FIG. 6 is a diagram for explaining an image sensor according to a modification example of the first embodiment.
Figure 7A:
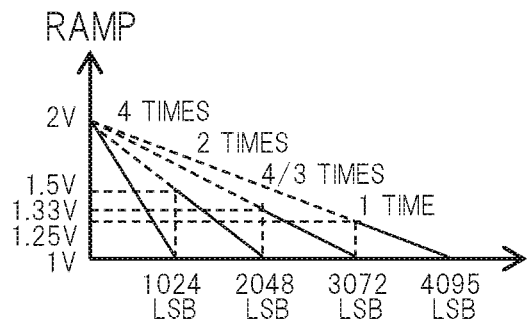
FIG. 7A is a waveform diagram for explaining the image sensor according to the modification example of the first embodiment.
Figure 7B:
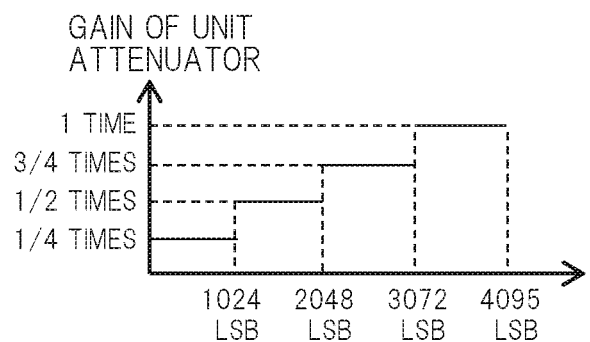
FIG. 7B is a waveform diagram for explaining the image sensor according to the modification example of the first embodiment.
Figure 7C:
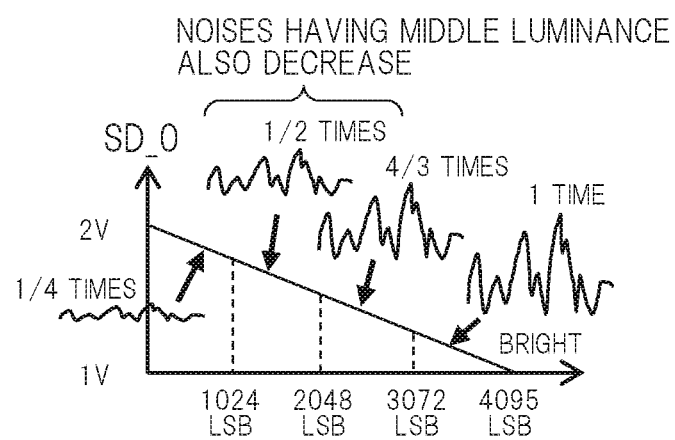
FIG. 7C is a waveform diagram for explaining the image sensor according to the modification example of the first embodiment.

FIG. 6 is a block diagram showing a configuration of an image sensor according to the modification example of the first embodiment. FIGS. 7A to 7C are waveform diagrams for explaining the image sensor according to the modification example of the first embodiment. Since FIG. 6 is similar to FIG. 2 while FIGS. 7A to 7C are similar to FIGS. 4A to 4C, differences will be mainly explained below.

FIG. 6 shows the unit attenuators AT_0 to AT_m connected to the ramp signal line RAMP_L, the corresponding comparators CP_0 to CP_m, and the ramp-signal generating circuit RAMP_G. As shown in FIG. 6, the ramp-signal generating circuit RAMP_G is shared among the plurality of attenuators and the plurality of comparators. The differences from FIG. 2 are as follows: The DAC circuit 2 shown in FIG. 6 can switch the reference electric current to 1 time, 4/3 times, 2 times or 4 times in accordance with the ramp control signal RAMP_C. Besides, the gain of the unit attenuator can be switched to 1 time, 4/3 times, ½ times or ¼ times since the switches DW1, DW3, DW4 or DW2 is selectively turned ON in accordance with the attenuator control signal ATT_C.

In the modification example, as the value of the digital code DCD, a range of 0 to 1023 is set to a first range, a range of 1024 to 2047 is set to a second range, a range of 2048 to 3071 is set to a third range, and a range of 3072 to 4095 is set to a fourth range. By the ramp control signal RAMP_C, the reference electric current of the DAC circuit 2 in the first range is set to 4 times, the reference electric current of the DAC circuit 2 in the second range is set to 2 times, the reference electric current of the DAC circuit 2 in the third range is set to 4/3 times, and the reference electric current of the DAC circuit 2 in the fourth range is set to 1 time. By the attenuator control signal ATT_C, the gain of the unit attenuator in the first range is set to ¼ times, the gain of the unit attenuator in the second range is set to ½ times, the gain of the unit attenuator in the third range is set to ¾ times, and the gain of the unit attenuator in the fourth range is set to 1 time.

The reference electric current of the DAC circuit 2 changes in accordance with the range in which the digital code DCD exists. Therefore, as shown in FIG. 7A, the voltage of the ramp signal RAMP in the first range changes from 2 (V) to 1 (V), the voltage in the second range changes from 1.5 (V) to 1 (V), the voltage in the third range changes from 1.33 (V) to 1 (V), and the voltage in the fourth range changes from 1.25 (V) to 1 (V). In other words, the gradient of the voltage of the ramp signal with respect to the change of the value of the digital code DCD is different among the first range to the fourth range.

As shown in FIG. 7B, the gain of the unit attenuator also changes in accordance with the change of the value of the digital code DCD. In other words, the gain of the unit attenuator in the first range is set to ¼ times, the gain of the unit attenuator in the second range is set to ½ times, the gain of the unit attenuator in the third range is set to ¾ times, and the gain of the unit attenuator in the fourth range is set to 1 time. As a result, as shown in FIG. 7C, a potential of the reference signal (such as SD_0) changes from 2 (V) to 1 (V) while having the same gradient with respect to the change of the value of the digital code DCD.

According to the modification example, as shown in FIG. 7C, in the second range (1024 to 2047) and the third range (2048 to 3071) corresponding to the middle luminance between the bright light and the dim light, the noise amount decreases since the gain of the unit attenuator becomes ½ times and ¾ times, and the ISO sensitivity can be further improved.

In the first embodiment, the ramp signal having the different gradient of the voltage change with respect to the value of the digital code DCD is output from the ramp-signal generating circuit RAMP_G, based on the range (the first to fourth ranges) in which the value of the digital code DCD exists. And, the gain of the attenuator receiving the supplied ramp signal is controlled to vary depending on the range (the first to fourth ranges) in which the value of the digital code DCD exists, and the attenuator outputs the reference signal having the constant gradient of the voltage change with respect to the change of the value of the digital code DCD. In consideration of the characteristics of human eyes, the attenuator decreases the noise amount in the first to third ranges corresponding to the pixel data of the dim light including the middle luminance, and therefore, the ISO sensitivity can be improved.

Second Embodiment

In the first embodiment, as shown in FIG. 1, the unit attenuator AT_0 to AT_m corresponding to the pixel data lines PID_0 to PID_m are connected to the ramp signal line RAMP_L. Since the number of the pixel data lines is, for example, 4000, the number of the unit attenuators connected to the ramp signal line RAMP_L is similarly very large. As a result, a parasitic capacitance connected to the ramp signal line RAMP_L is very large.

In the first embodiment, when the value of the digital code DCD changes from the first range to the second range, while the voltage of the ramp signal RAMP changes from 1 (V) to 1.75 (V), this voltage change takes time since the ramp signal line RAMP_L has the very large parasitic capacitance.

Figure 8A:
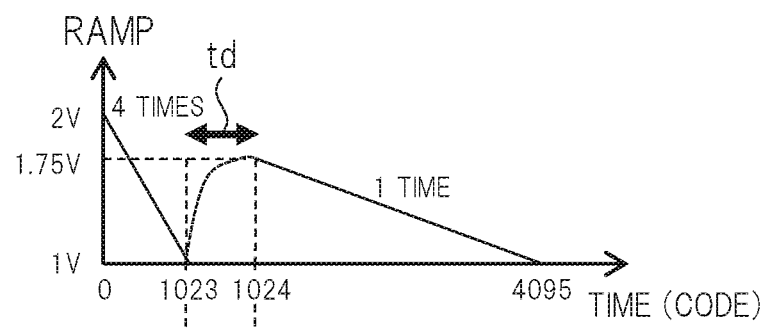
FIG. 8A is a waveform diagram for explaining a problem generated in the image sensor according to the first embodiment.
Figure 8B:
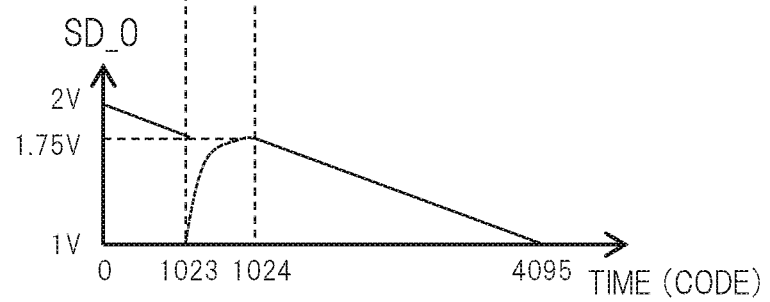
FIG. 8B is a waveform diagram for explaining a problem generated in the image sensor according to the first embodiment.

FIGS. 8A and 8B are waveform diagrams for explaining a problem of the image sensor according to the first embodiment. As shown in FIG. 8A, the voltage of the ramp signal RAMP changes from 1 (V) to 1.75 (V) when the value of the digital code DCD changes from 1023 to 1024, and a period "td" is necessary for this voltage change. Because of this, the voltage of the reference signal SD_0 in the period td also increases from 1 (V) to 1.75 (V) as shown in FIG. 8B. This result leads to problems that is taking long time for the change of the voltage value of the reference signal SD_0 from 2 (V) to 1 (V), taking long time for conversion of data on one pixel row of the pixel array PXA (FIG. 16) into the digital signal, and delaying the frame rate.

Figure 9:
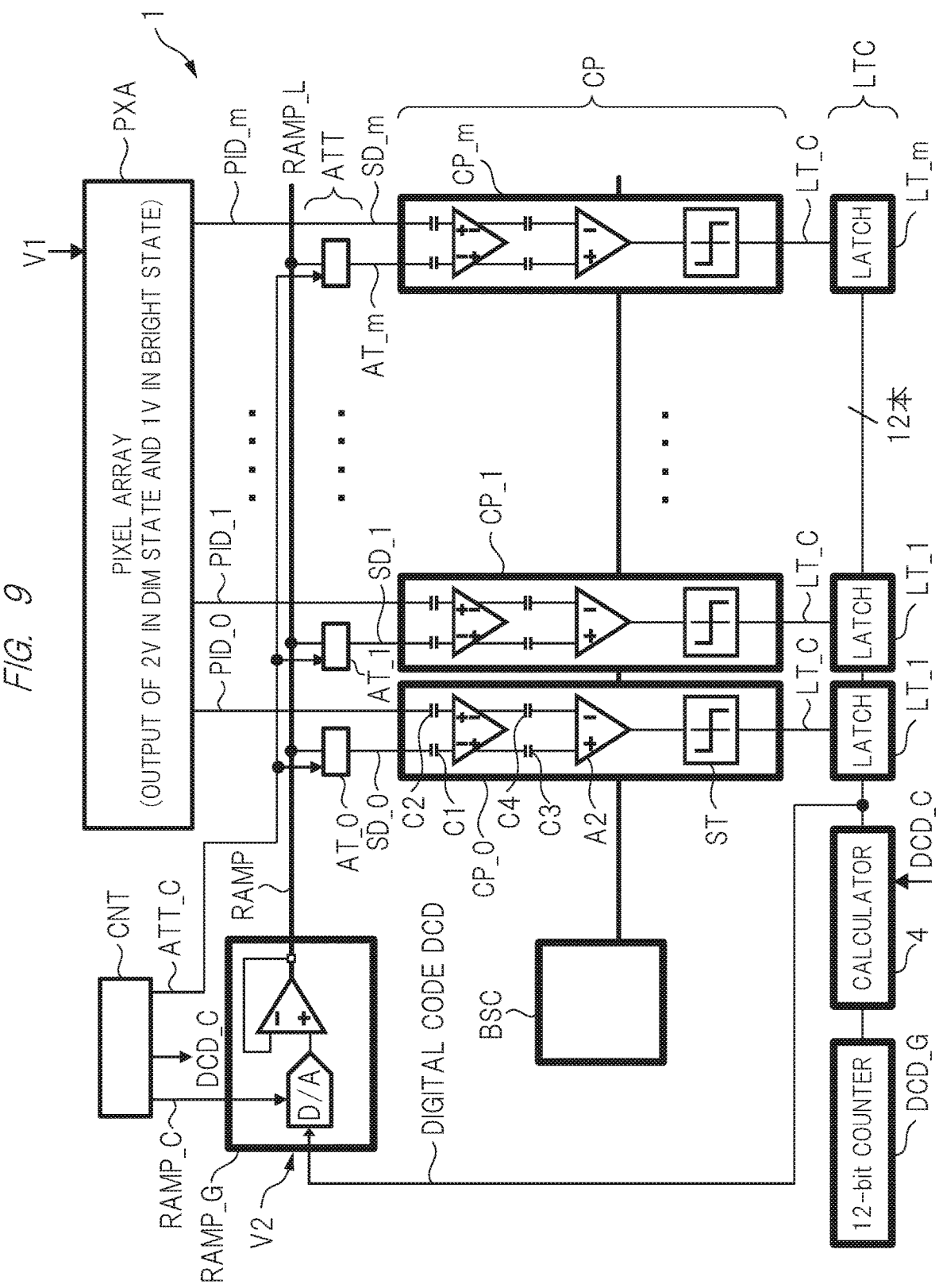
FIG. 9 is a block diagram showing a configuration of an image sensor according to a second embodiment.

FIG. 9 is a block diagram showing a configuration of an image sensor according to a second embodiment. FIG. 9 is similar to FIG. 1, and therefore, its differences will be mainly explained below. The differences in FIG. 9 are that the output of the code generating circuit DCD_G is supplied to the calculator 4 while the output of the calculator 4 is the digital code DCD and that the control circuit CNT outputs the code control signal DCD_C for controlling the calculator 4.

Figure 10:
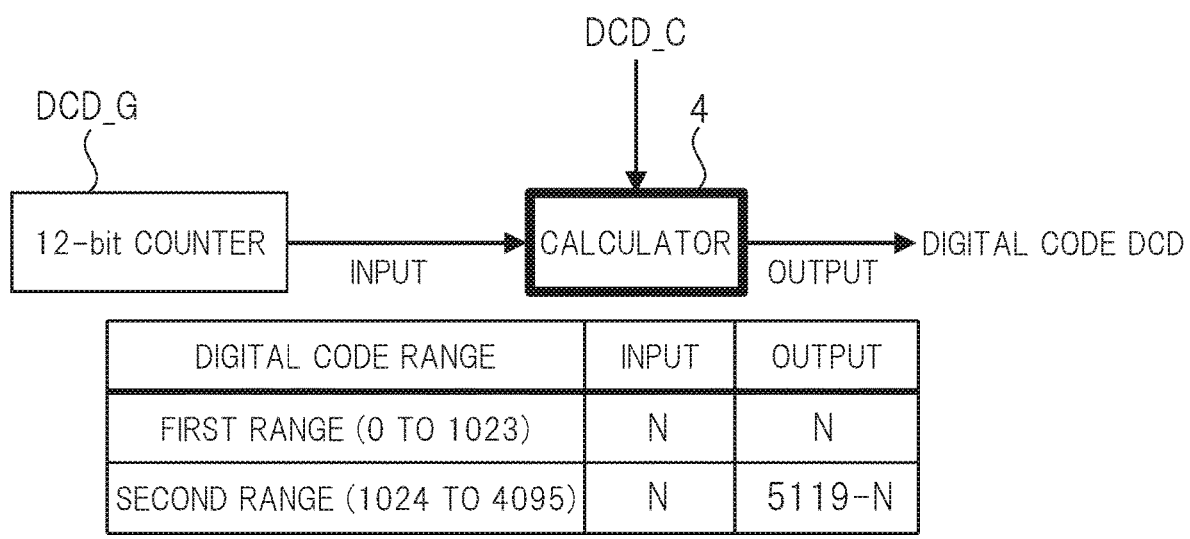
FIG. 10 is a diagram for explaining a calculator according to the second embodiment.
Figure 11A:
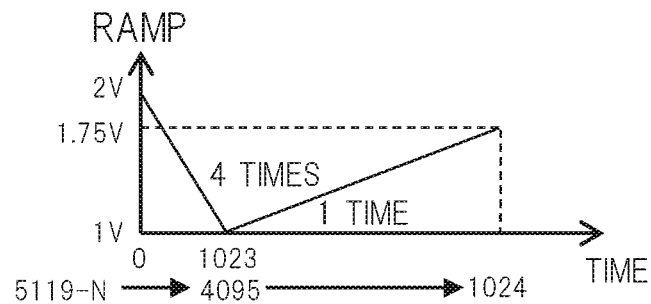
FIG. 11A is a waveform diagram for explaining an operation of the image sensor according to the second embodiment.
Figure 11B:
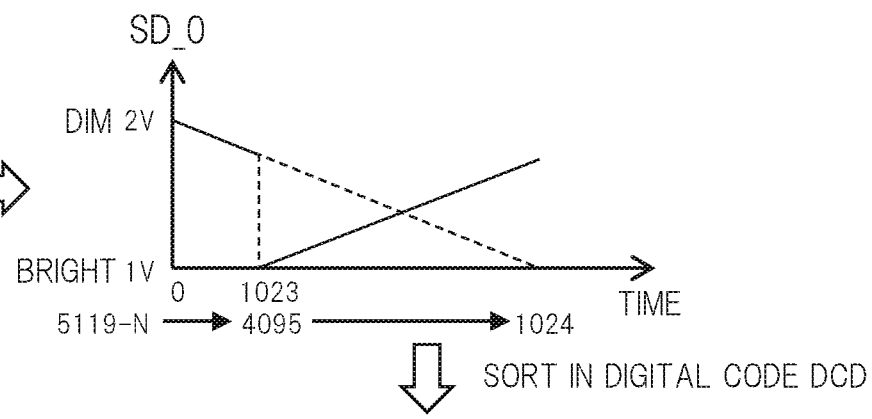
FIG. 11B is a waveform diagram for explaining an operation of the image sensor according to the second embodiment.
Figure 11C:
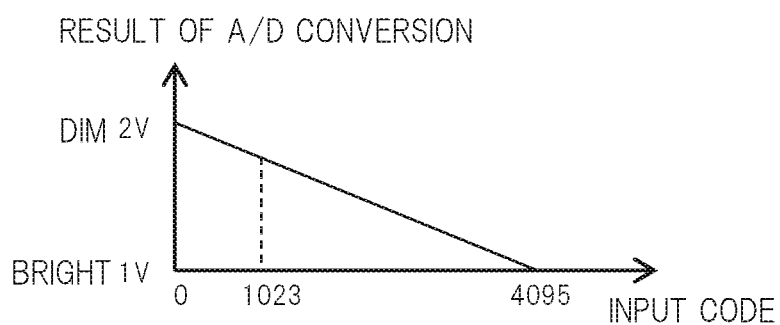
FIG. 11C is a waveform diagram for explaining an operation of the image sensor according to the second embodiment.

FIG. 10 is a diagram for explaining the calculator according to the second embodiment. FIGS. 11A to 11C are waveform diagrams for explaining an operation of the image sensor according to the second embodiment.

By the code control signal DCD_C output from the control circuit CNT, the calculator 4 is notified that the value of the digital code DCD exists in either the first range (0 to 1023) or the second range (1024 to 2095).

If the calculator is notified that the value exists in the first range, the calculator 4 outputs an input "N" received by itself from the code generating circuit DCD_G, as an output "N" remain unchanged. In other words, in the case of the first range, the output of the code generating circuit DCD_G is used as the digital code DCD.

On the other hand, if the calculator is notified that the value exists in the second range, the calculator 4 subtracts the input N received by itself from the code generating circuit DCD_G, from 5119 (in decimal), and outputs a subtraction result (5119−N). In other words, in the case of the second range, the subtraction result is used as the digital code DCD.

If the code value "1023", and then, the code value "1024" are output from the code generating circuit DCD_G, the calculator 4 outputs the value "1023" of the digital code DCD, and then, outputs the value "4095" of the digital code DCD resulted from the subtraction. Then, when the 12-bit counter that is the code generating circuit DCD_G repeatedly performs the counting up, the value of the digital code DCD changing from "4095" to "1024" is output from the calculator 4.

As a result, as shown in FIG. 11A, in the second range, the ramp signal RAMP changing to increase from 1 (V) to 1.75 (V) is output from the ramp-signal generating circuit RAMP_G. In other words, in the first range, the ramp-signal generating circuit RAMP_G outputs the ramp signal RAMP of 1 (V), and then, the voltage of the ramp signal RAMP consecutively changes from 1 (V) to 1.75 (V). Since the voltage of the ramp signal RAMP consecutively changes, it is unnecessary to take the period td for the change of the voltage of the ramp signal RAMP from 1 (V) to 1.75 (V) as explained in FIG. 8A.

As illustrated with a solid line in FIG. 11B, the reference voltage SD_0 reaches the voltage 1.75 (V) corresponding to the value "1023" of the digital code DCD, and changes to 1 (V) corresponding to the value "4095" of the digital code DCD, and then, increases to the voltage corresponding to the value "1024" of the digital code DCD.

When the value of the digital code DCD is in the second range, the comparator CP_0 performs the comparison with the pixel data in accordance with the time passage from the reference voltage SD_0 corresponding to the value "4095" of the digital code DCD to the reference voltage SD_0 corresponding to the value "1024" of the digital code DCD. Since the digital conversion results that are provided when the value of the digital code DCD is in the second range are rearranged (sorted) in the order of the digital code DCD, consecutive results of the ADC circuit 1 can be provided as shown in FIG. 11C.

This embodiment has been explained based on the example in which the reference electric current of the DAC circuit 2 is switched to 1 time or 4 times while the gain of the attenuator ATT is switched to 1 time or ¼ times. However, the present invention is not limited to this example. For example, as described in the modification example of the first embodiment, the number of switching of the reference electric current and the number of switching of the gain may be four or more.

The calculator 4 may be provided with a decrement counter, and the digital code DCD in the second range may be formed by the decrement counter decrementing the value from "4095" to "1024".

According to the second embodiment, the noise amount can be decreased to improve the ISO sensitivity, and the problem of the delay of the frame rate can be solved.

Third Embodiment

Figure 12:
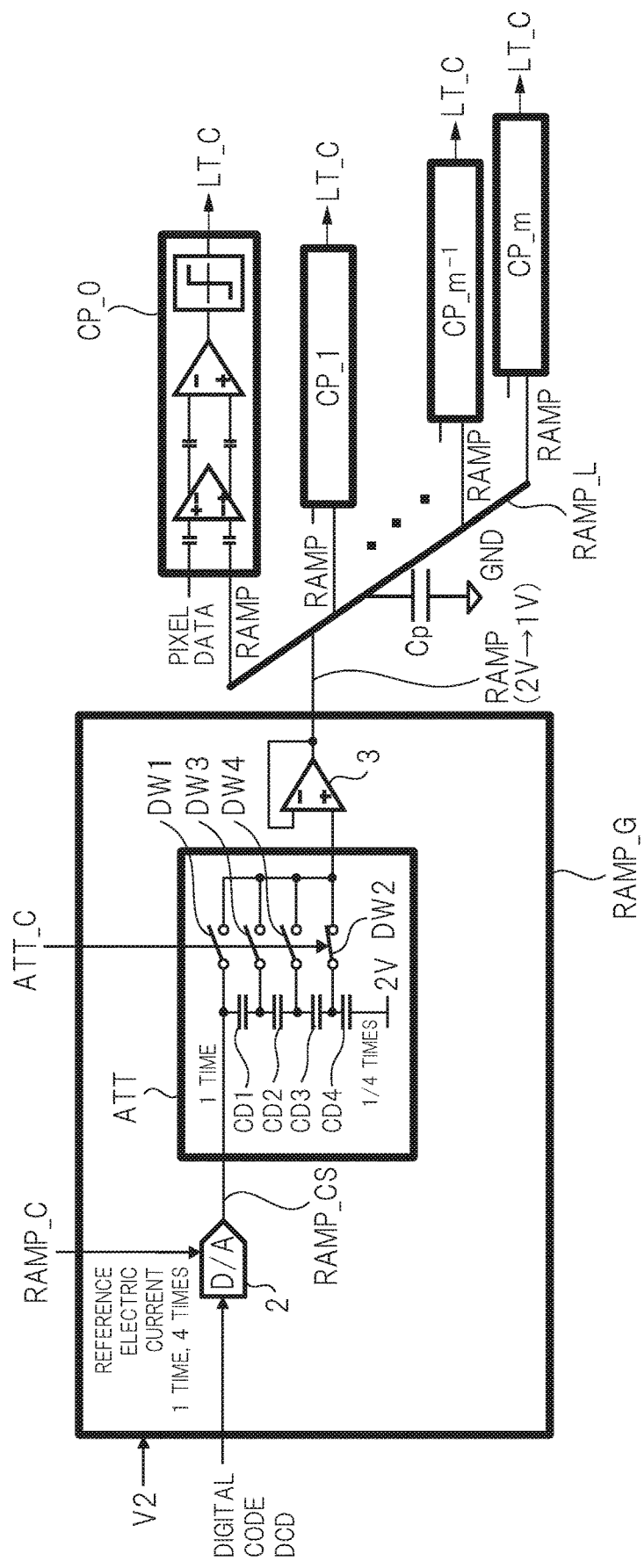
FIG. 12 is a block diagram showing a configuration of an image sensor according to a third embodiment.
Figure 13A:
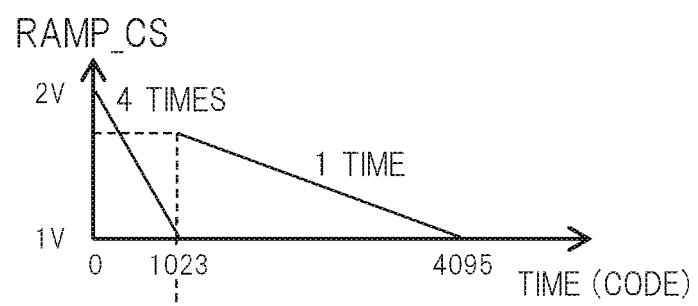
FIG. 13A is a waveform diagram for explaining an operation of the image sensor according to the third embodiment.
Figure 13B:
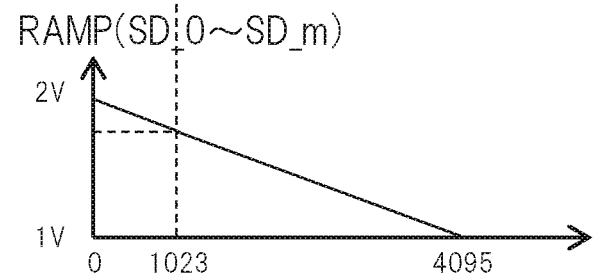
FIG. 13B is a waveform diagram for explaining an operation of the image sensor according to the third embodiment.

FIG. 12 is a block diagram showing a configuration of an image sensor according to a third embodiment. FIGS. 13A and 13B are waveform diagrams for explaining an operation of the image sensor according to the third embodiment.

FIG. 12 is similar to FIG. 6, and therefore, its differences will be mainly explained. In FIG. 12, the unit attenuators AT_0 to AT_m are removed, and the ramp signal line RAMP_L is connected to the comparators CP_0 to CP_m. A unit attenuator is connected as the attenuator ATT between the DAC circuit 2 and the voltage follower circuit 3. In other words, the ramp-signal generating circuit RAMP_G includes the DAC circuit 2, the attenuator ATT and the voltage follower circuit 3.

The DAC circuit 2 outputs a ramp signal RAMP_CS in accordance with the digital code DCD. The ramp signal RAMP_CS is supplied as the ramp signal RAMP to the ramp signal line RAMP_L through the attenuator ATT and the voltage follower circuit 3. The comparators CP_0 to CP_m compare the ramp signal RAMP and the pixel data in place of the reference signals SD_0 to SD_m, and outputs the trigger signal LT_C.

The attenuator ATT according to the third embodiment is shared among the comparators CP_0 to CP_m, and therefore, can be regarded as a common attenuator. Regarding the DAC circuit 2 and the attenuator ATT, the reference electric current and the gain are switched by the ramp control signal RAMP_C and the attenuator control signal ATT_C as described in the first embodiment.

In FIG. 12, a term "Cp" represents a parasitic capacitance generated by the comparators CP_0 to CP_m connected to the ramp signal line RAMP_L. As described in the second embodiment, if the number of the pixel data lines is 4000, 4000 comparators are connected to the ramp signal line RAMP_L, and therefore, the parasitic capacitance Cp is very large.

In the third embodiment, the output of the DAC circuit 2 is connected to only the attenuator ATT. Therefore, the parasitic capacitance connected to the output of the DAC circuit 2 can be reduced. Since the parasitic capacitance is small, the ramp signal RAMP_CS can be rapidly increased to 1.75 (V) as shown in FIG. 13A by the supply of the digital code value "1024" after the ramp signal RAMP_CS reaches 1 (V) in the digital code value "1023". Meanwhile, the parasitic capacitance Cp is connected to the output of the voltage follower circuit 3, and the ramp signal RAMP (corresponding to SD_0 to SD_m) can be smoothly changed by the voltage follower circuit 3 as shown in FIG. 13B.

According to the third embodiment, the noise amount can be decreased to improve the ISO sensitivity, the delay of the frame rate can be suppressed, and the increase in the exclusive area can be suppressed by the reduction in the number of components.

FIG. 13A shows a waveform in the case of the reference electric current switching to 1 time and 4 times and the gain switching to 1 time and ¼ times. However, the multiple number in the switching is not limited to them.

Fourth Embodiment

In the first to third embodiments, the image sensor has been explained, the image sensor being preferable in the case of the lower second voltage V2 for operating the ramp-signal generating circuit RAMP_G than the first voltage V1 for operating the pixel array PXA. In a fourth embodiment, an image sensor will be explained, the image sensor being preferable in a case of a higher voltage for operating the ramp-signal generating circuit RAMP_G than the second voltage V2 to be, for example, as the same as the first voltage V1.

Figure 14:
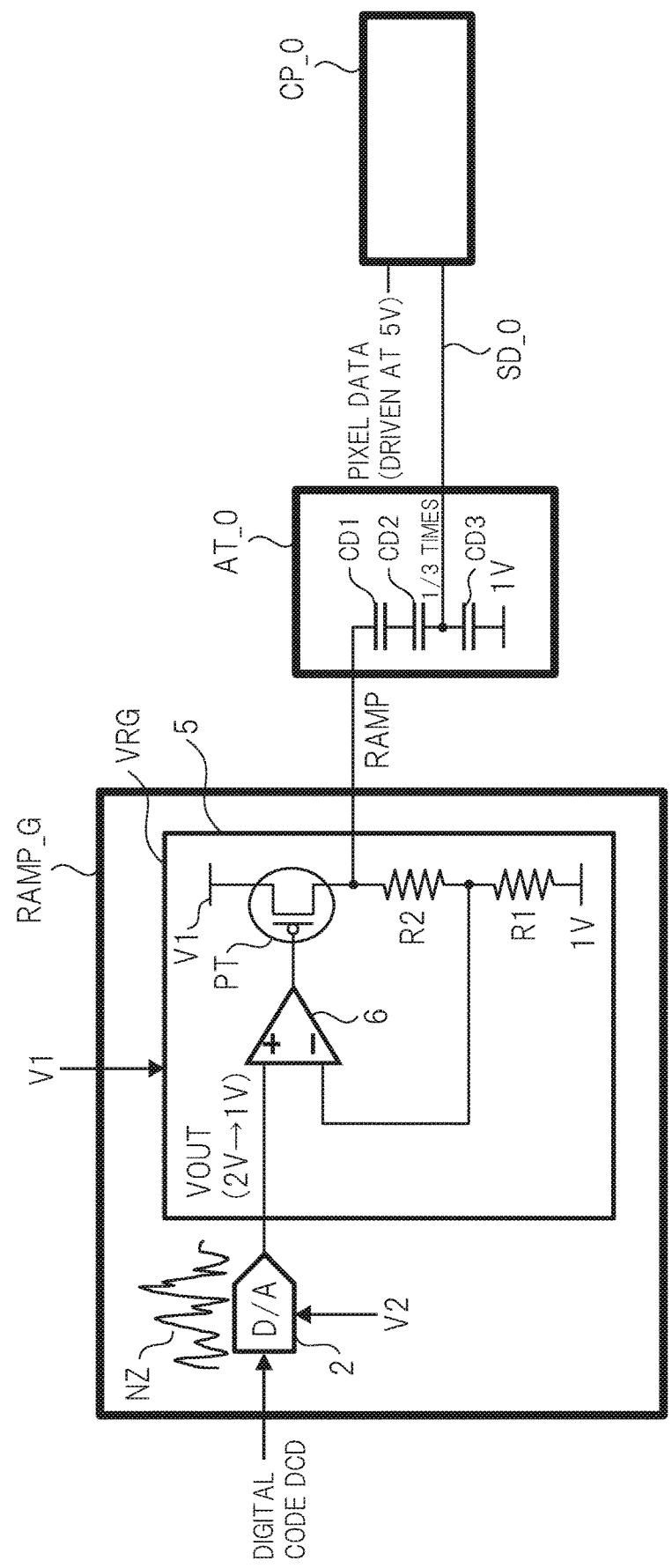
FIG. 14 is a block diagram showing a configuration of an image sensor according to a fourth embodiment.

FIG. 14 is a block diagram showing a configuration of the image sensor according to the fourth embodiment. FIG. 14 is similar to FIG. 2. In other words, FIG. 14 shows only the ramp-signal generating circuit RAMP_G, the unit attenuator AT_0 and the comparator CP_0 corresponding to the pixel data line PID_0 in the ADC circuit 1 shown in FIG. 1. Other unit attenuators and comparators not shown in FIG. 14 and others also have the same configurations. Note that the fourth embodiment does not include the control circuit CNT shown in FIG. 2.

The ramp-signal generating circuit RAMP_G according to the fourth embodiment includes: the DAC circuit 2 for converting the digital code DCD into the ramp signal VOUT of the analog signal; and a voltage regulator (voltage-dividing feed-back regulator) VRG.

The first voltage V1 that is the same as that of the pixel array PXA is supplied to the voltage regulator VRG, and the voltage regulator VRG is operated by this first voltage V1. On the other hand, the second voltage V2 is supplied to the DAC circuit 2 as similar to the first to third embodiments, and the DAC circuit 2 is operated by the second voltage V2. Although not particularly limited, the second voltage V2 is formed from the first voltage V1 by a voltage step-down circuit not illustrated.

The voltage regulator VRG is made of a comparator 6, a transistor PT and resistor elements R1 and R2. The transistor PT is made of a P-channel type transistor. The transistor PT and the resistor elements R1 and R2 are connected in series between the first voltage V1 and the voltage of 1 (V). One input (+) of the comparator 6 receives the supplied ramp signal VOUT, the other input (−) of the same is connected to a connection node between the resistor elements R1 and R2, and an output of the comparator 6 is supplied to a gate of the transistor PT. The ramp signal RAMP is output from the connection node between the transistor PT and the resistor element R2.

The DAC circuit 2 is operated by the second voltage V2, and therefore, outputs the ramp signal VOUT changing between 2 (V) and 1 (V) in accordance with the value of the digital code DCD as similar to the first to third embodiments. On the other hand, the voltage regulator VRG is operated by the first voltage V1 higher than the second voltage V2, and therefore, converts the ramp signal VOUT changing between 2 (V) and 1 (V) into the ramp signal RAMP changing between the voltage higher than 2 (V) and 1 (V), and then, outputs the converted signal. When an ON resistance of the transistor PT is ignored, the voltage of the ramp signal RAMP is expressed as "(R1+R2)/P1×(VOUT−1 (V))+1 (V)". An example in which a ratio between the resistor elements R1 and R2 is expressed as "1:2" while the first voltage V1 is 5 (V) will be explained below. In this case, the voltage of the ramp signal RAMP changes between 4 (V) and 1 (V) in accordance with the value of the digital code DCD. In other words, the voltage regulator VRG functions as a voltage-dividing regulator that expands an amplitude of the ramp signal VOUT (changing between 2 (V) and 1 (V)) output from the DAC circuit 2 and outputs the ramp signal RAMP (changing between 4 (V) and 1 (V)).

The unit attenuator AT_0 is made of three capacitance elements CD1 to CD3 that are connected in series between the ramp signal RAMP and the voltage 1 (V), and the reference signal SD_0 is output from a connection node between the capacitance elements CD2 and CD3. In other words, the gain of the unit attenuator AT_0 shown in FIG. 14 is fixed to ⅓ times.

The comparator CP_0 is operated by, for example, the second voltage V2. The comparator CP_0 operates to compare the pixel data and the reference signal SD_0 as described above.

FIGS. 15A and 15B are waveform diagrams for explaining a configuration of the image sensor according to the fourth embodiment. FIG. 15A shows a voltage waveform of the ramp signal RAMP, and FIG. 15B shows a voltage waveform of the reference signal SD_0. Note that each horizontal axis in both FIGS. 15A and 15B shows the digital code DCD.

As shown in FIG. 15A, the voltage of the ramp signal RAMP output from the voltage regulator VRG decreases along a first gradient from 4 (V) to 1 (V). By the unit attenuator AT_0, the reference signal SD_0 is output while the ramp signal RAMP is attenuated to ⅓ times. Therefore, as shown in FIG. 15B, the reference signal SD_0 decreases along, for example, a second gradient that is smaller than the first gradient from 2 (V) to 1 (V). When the noise NZ superimposes the ramp signal RAMP as shown in FIG. 15A, the noise NZ is attenuated to ⅓ times by the unit attenuator AT_0.

According to the fourth embodiment, the noises can be attenuated in the entire luminance, and the ISO sensitivity can be improved. And, since the control circuit CNT described in the first to third embodiments is unnecessary, the increase in the exclusive area for the control circuit can be suppressed.

FIG. 14 shows the case in which the gain of the unit attenuator AT_0 is ⅓ times. However, the present invention is not limited to this case. And, as shown in FIG. 12, not the unit attenuator but a common attenuator may be used.

In the first to third embodiments, the control circuit CNT outputs the ramp control signal RAMP_C, the attenuator control signal ATT_C and the code control signal DCD_C, based on the digital code DCD although not particularly limited. For example, the control circuit CNT compares the value of the digital code for determining the first to fourth ranges and others with the value of the digital code DCD output from the code generating circuit DCD_G, and outputs the ramp control signal RAMP_C, the attenuator control signal ATT_C and the code control signal DCD_C corresponding to a period where the values match each other.

In the foregoing, the invention made by the inventors of the present invention has been concretely described on the basis of the embodiments. However, it is needless to say that the present invention is not limited to the foregoing embodiments, and various modifications can be made within the scope of the present invention. For example, the first to third embodiments are made in the example of the output of the ramp control signal RAMP_C, the attenuator control signal ATT_C and the code control signal DCD_C from the common control circuit CNT. However, the present invention is not limited to this example. For example, the ramp-signal generating circuit RAMP_G, the attenuator ATT and the calculator 4 may generate the respective control signals, based on the output of the code generating circuit DCD_G.

EXPLANATION OF REFERENCE CHARACTERS

1 ADC circuit
2 DAC circuit
3 voltage follower circuit
4 calculator
100 image sensor
ATT attenuator
BSC bias circuit
CNT control circuit
CP comparing circuit
DCD_G code generating circuit
PID_0 to PID_m pixel data line
RAMP signal
RAMP_G ramp-signal generating circuit
SD_0 to SD_m reference signal

What is claimed is:

1. An image sensor comprising:
a pixel array having a plurality of image-capturing elements; and
an ADC circuit receiving pixel data to be supplied in parallel from the pixel array,
the ADC circuit including:
a reference-signal generating circuit outputting a reference signal in accordance with a digital code; and
a comparing circuit comparing the reference signal and the pixel data, and
the ADC circuit outputting the digital code at which the reference signal and the pixel data have a predetermined relation,
wherein the reference-signal generating circuit includes:
a ramp-signal generating circuit outputting a ramp signal having a gradient with respect to change of the digital code, the gradient being different between when the digital code is in a first range and when the digital code is in a second range different from the first range; and
an attenuator receiving the ramp signal to be supplied and outputting the reference signal having a gradient being the same between when the digital code is in the first range and when the digital code is in the second range.

2. The image sensor according to claim 1,
wherein the comparing circuit includes a plurality of comparators corresponding to the pixel data supplied in parallel,
the ADC circuit includes a plurality of latch circuits corresponding to the plurality of comparators,
the digital code is supplied to the plurality of comparators, and,
when a corresponding comparator shows that the pixel data and the digital code match with each other, the latch circuit retains the digital code as a digital code corresponding to the pixel data.

3. The image sensor according to claim 2,
wherein the attenuator includes a voltage-dividing circuit dividing a voltage of the ramp signal.

4. The image sensor according to claim 2,
wherein the reference-signal generating circuit includes:
a code generating circuit generating a code; and
a calculator receiving the code generated by the code generating circuit and outputting the digital code,
the calculator outputs a digital code value consecutively changing the ramp signal when changing from the first range to the second range.

5. The image sensor according to claim 2,
wherein the attenuator includes a plurality of unit attenuators corresponding to the plurality of comparators.

6. The image sensor according to claim 2,
wherein the reference signal output from the attenuator is supplied in common to the plurality of comparators.

7. The image sensor according to claim 1,
wherein the pixel array is operated by a first voltage, and the ADC circuit is operated by a second voltage that is a lower voltage value than the first voltage.

8. An image sensor comprising:
a pixel array having a plurality of image-capturing elements and operated by a first voltage; and
an ADC circuit receiving pixel data to be supplied in parallel from the pixel array,
the ADC circuit including:
a reference-signal generating circuit outputting a reference signal in accordance with a digital code; and
a comparing circuit comparing the reference signal and the pixel data, and
the ADC circuit outputting the digital code at which the reference signal and the pixel data have a predetermined relation, wherein the reference-signal generating circuit includes:
   a generating circuit operated by a second voltage having a lower voltage value than the first voltage and outputting a ramp signal having a first gradient in accordance with change of the digital code value;
   a voltage converting circuit operated by the first voltage and converting a voltage of the ramp signal; and
   an attenuator receiving the ramp signal to be supplied and converted by the voltage converting circuit and outputting a ramp signal having a second gradient being different from the first gradient, as the reference signal.

9. The image sensor according to claim 8,
wherein the generating circuit includes a DAC circuit converting the digital code value into an analog signal,
the voltage converting circuit includes a voltage-dividing feed-back regulator operated by the first voltage, and
the attenuator includes a voltage-dividing circuit made of a plurality of capacitance elements.

* * * * *